US006917721B2

(12) United States Patent
Elad et al.

(10) Patent No.: US 6,917,721 B2
(45) Date of Patent: Jul. 12, 2005

(54) METHOD AND APPARATUS FOR SUB-PIXEL EDGE DETECTION

(75) Inventors: Michael Elad, Haifa (IL); Doron Shaked, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 660 days.

(21) Appl. No.: 09/906,880

(22) Filed: Jul. 16, 2001

(65) Prior Publication Data

US 2003/0031385 A1 Feb. 13, 2003

(51) Int. Cl.[7] .................................................. G06T 3/20
(52) U.S. Cl. ...................................... 382/300; 382/295
(58) Field of Search ................................ 382/300, 295, 382/278, 279

(56) References Cited

U.S. PATENT DOCUMENTS

| | | | | |
|---|---|---|---|---|
| 4,244,029 A | * | 1/1981 | Hogan et al. | 382/218 |
| 4,849,906 A | * | 7/1989 | Chodos et al. | 348/171 |
| 5,550,937 A | * | 8/1996 | Bell et al. | 382/293 |
| 5,943,442 A | * | 8/1999 | Tanaka et al. | 382/216 |
| 6,064,768 A | * | 5/2000 | Hajj et al. | 382/195 |
| 6,129,278 A | | 10/2000 | Wang et al. | |
| 6,208,769 B1 | | 3/2001 | Pankratov | |
| 6,408,109 B1 | * | 6/2002 | Silver et al. | 382/300 |

OTHER PUBLICATIONS

Anil Jain, Fundamentals of Digital Image Processing, Prentice Hall, Englewood Cliffs, NJ, 1989, pp. 347–357.
J. Canny, "A Computational approach to Edge Detections", IEEE Trans. Pattern Analysis and Machine Intelligence, vol. PAMI–8, No. 6, Nov. 1986, pp. 679–698.

Richard O. Duna and Peter E. Hart, Pattern Classification And Scene Analysis (John Wiley & Sons, A Wiley–Interscience Publication), pp. 266–273.

Andres Huertas Member, IEEE, And Gerard Medioni, Member, IEEE, Detection of Intensity Changes with Subpixel Accuracy Using Laplacian Masks, IEEE Transactions on Pattern Analysis And Machine Intelligence, vol. PAMI–8, No. 5, Sep. 1986, pp. 651–664.

(Continued)

*Primary Examiner*—Daniel Miriam
*Assistant Examiner*—Dennis Rosario-Vasquez

(57) ABSTRACT

A method and apparatus for processing an image are disclosed. For edge detection, the zero crossing pixel location, $n_0$, within the image is identified. Then, a sub-pixel position offset, a, is determined. The offset is a relationship between interpolated image and an interpolated kernel at the zero crossing pixel location. Finally, the interpolated position for the edge location, $t_0$, is determined from the pixel location, $n_0$, and the sub-pixel position offset, a. For matching the detected edges of an object to edges of a model object, translation $[v_1, v_2]$ between a detected edge of an object in the image and the corresponding edge of a model object is first determined. Next, cross correlation between the detected edge and the corresponding model edge is calculated. Then, translation error $[e_1, e_2]$ is determined. Finally, the translation is updated.

31 Claims, 6 Drawing Sheets

OTHER PUBLICATIONS

Huertas A et al: "Detection of Intensity Changes iwth Subpixel Accuracy g Laplacian–Gaussion Masks" IEEE Transactions on Pattern Analysis and Machine Intelligence, IEEE Inc. NY, USA vol. PAMI–8, No. 5 Sep. 1986, pp. 651–644 XP00085782.

Medioni G. et al: "The Registar Machine: from conception to installation" Applications of Computer Vision Proceedings, 1992, IEEE Workshopon Palm Springs, CA USA Nov. 30–Dec. 2, 1992 pp. 224–231, XP010029143.

Jin J S et al: "Extract zero–crossings in a single–pass filtering" Real–Time Imaging II, San Jose, CA USA, Feb. 10, 1997 vol., 3028, pp. 14–25, XP008020665.

Yu T–H et al: "A new robust approach to diffuse edge detection" Military Communications conference Record Milcom 1992, Conference Record Oct. 11, 1992 pp. 1116–1121 XP010060906.

Baba M et al: "A novel subpixel edge detection system for dimension measurement and object localization using an analogue–based approach" Advances in Acousto–Optices 2000, Bruges, Belgium, May 25–26, 2000, vol. 3, No. 4, pp. 276–283 XP002250953.

\* cited by examiner

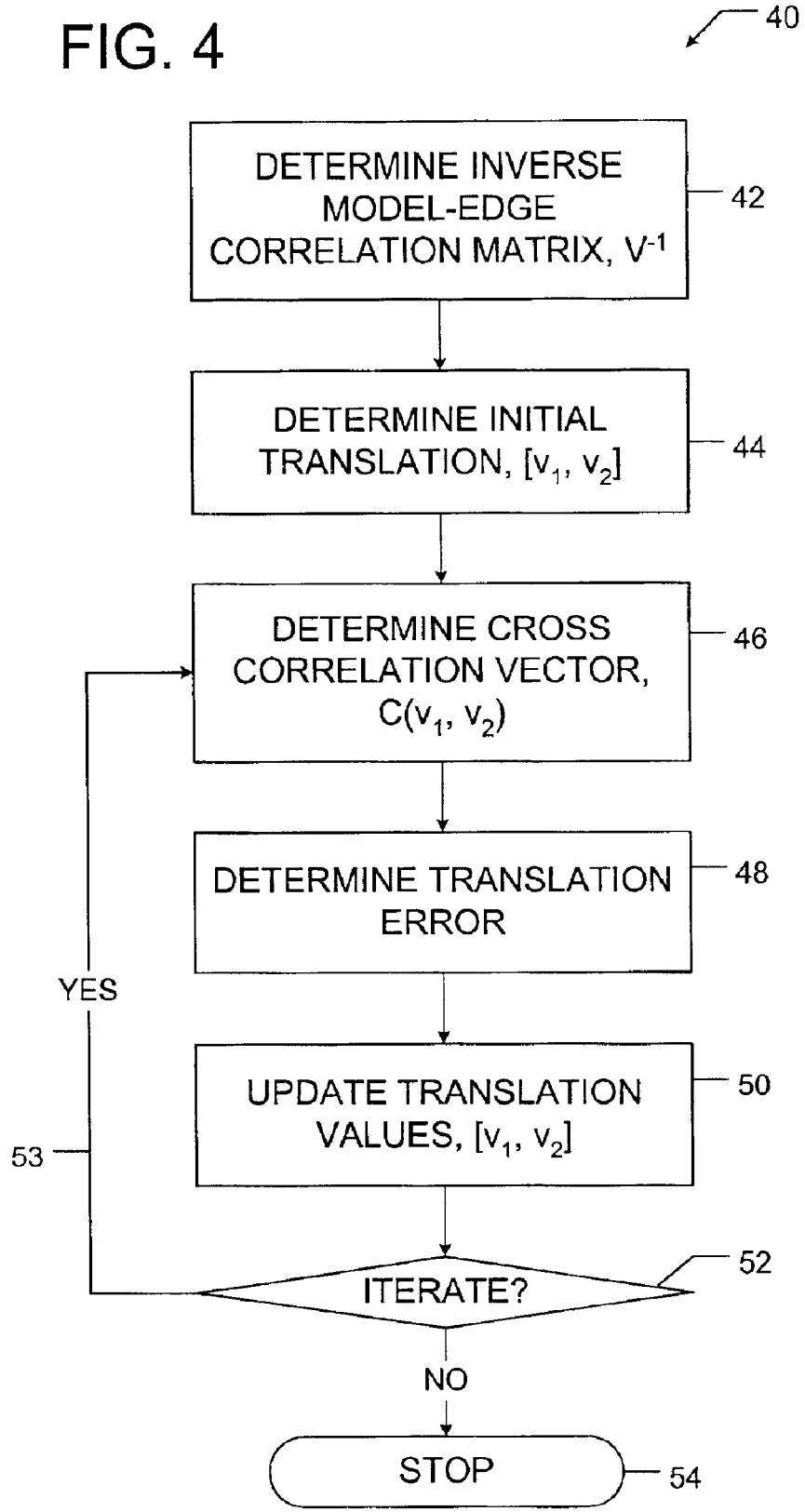

METHOD AND APPARATUS FOR SUB-PIXEL EDGE DETECTION

BACKGROUND

The present invention relates to the art of processing digital images. More particularly, the present invention relates to the art of locating edges of a digital image.

In many visual inspection applications, for example in production control and quality assurance during manufacturing, accurate edge detection and measurements are essential. To detect, or locate, edges of manufactured goods, one or more images are taken of the goods. In computer or machine vision applications, the image taken is typically represented by a two-dimensional (2D) array of pixels, each pixel having one gray value (or three values representing a color). Then, the image is processed by a computing machine for edge detection, for example in order to determine the location of the object whose image was taken.

To reduce hardware costs and high computational requirements of processing large images, the images are often under-sampled and parts of the processing algorithm (such as edge detection) resort to sub-pixel measurements. Given a gray-value image (of an object) sampled onto a 2D discrete grid, it is possible to estimate the location of edges of the object with sub-pixel accuracy.

The sub-pixel edge detection relies on two properties common in natural images: (1) high spatial correlation that exists between neighboring pixels; and (2) intermediate gray-values which indicate sub-pixel edge position. Using these properties, several methods exist to detect edges of the image.

For example, the image is first enlarged and zoomed using interpolation. Interpolation, in this context, produces a larger image where the pixel values are mathematically estimated from values of neighboring pixels in the original image. Then, one or more edge detection kernels (also referred to as filters) are used to filter the zoomed image to enhance and detect, or locate, the edges. The filtering process is a convolution of two arrays of numbers (for example, the interpolated image and the filter kernel) to produce a third array of numbers.

Such edge detection filter might effectively take a second derivative of the interpolated image. The edge is located at the pixel interface in which the second derivative crosses the zero value. This technique is often called a zero-crossing technique. The zero-crossing technique and the filtering step are known in the art.

One drawback of the method is that it is computationally expensive and it requires increasing amount of computational power to increase accuracy. For example, to detect sub-pixel edges of an N×N image (for example a 100 by 100 2D grid image), the image is first enlarged by interpolation by a multiplication factor (for example two, four, or another integer). If the factor of four is used for interpolation, then the 100×100 image (having a total of 10,000 pixels) is interpolated into a 400×400 image (having a total of 160,000 pixels). Then, the filtering step (a computationally intensive step) is performed on the enlarged, interpolated image to find the edges of the image. To increase accuracy of the edge detection processes, either a larger original image is taken or the multiplication factor for the interpolation step is increased. Either way, the computational requirement of the filtering step is increased by the square of the increase of the interpolated image size.

There remains a need for a technique to increase edge detection accuracy without increasing the computational cost.

SUMMARY

The need is met by the present invention. According to a first aspect of the present invention, a method of processing an image is disclosed. First, a zero crossing pixel location, $n_0$, within the image is identified. Next, a sub-pixel position offset, a, is found, the offset being a relationship between interpolated image and an interpolated kernel at the zero crossing pixel location. Finally, an edge location, $t_0$, of the image is determined using the pixel location, $n_0$, and the sub-pixel position offset, a.

According to a second aspect of the invention, a method of processing an image is disclosed. First, translation $[v_1, v_2]$ between detected edge locations of an object in the image and corresponding edge locations of a model object is found. Then, cross correlation between the detected object edge locations and the corresponding model object edge locations is determined. Next, translation error vector $[e_1, e_2]$ is calculated. Finally, the translation is updated.

According to a third aspect of the invention, an apparatus for processing an image includes a processor and storage connected to the processor is disclosed. The storage has instructions for the processor to identify a zero crossing pixel location, $n_0$, within the image; to determine a sub-pixel position offset, a, the offset being a relationship between interpolated image and an interpolated kernel at the zero crossing pixel location; and to determine an edge location, $t_0$, of the image using the pixel location, $n_0$, and the sub-pixel position offset, a.

According to a fourth aspect of the invention, an apparatus for processing an image includes a processor and storage connected to the processor is disclosed. The storage has instructions for the processor to determine translation $[v_1, v_2]$ between detected edge locations of an object in the image and corresponding edge locations of a model object; to determine cross correlation between the detected object and the corresponding model edge; determine translation error vector $[e_1, e_2]$; and to update the translation.

According to a fifth aspect of the invention, an article of manufacture for a computer is disclosed. The article includes computer memory. The memory has a program stored within, the program, when executed, causing the computer to identify a zero crossing pixel location, $n_0$, within the image; determine a sub-pixel position offset, a, the offset being a relationship between interpolated image and an interpolated kernel at the zero crossing pixel location; and determine an edge location, $t_0$, of the image using the pixel location, $n_0$, and the sub-pixel position offset, a.

According to a sixth aspect of the invention, an article of manufacture for a computer is disclosed. The article includes computer memory. The memory has a program stored within, the program, when executed, causing the computer to determine translation $[v_1, v_2]$ between detected edge locations of an object in the image and corresponding edge locations of a model object; to determine cross correlation between the detected object edge locations and the corresponding model edge locations; to determine translation error vector $[e_1, e_2]$; and to update the translation.

Other aspects and advantages of the present invention will become apparent from the following detailed description, taken in combination with the accompanying drawings, illustrating by way of example the principles of the invention.

BRIEF DESCRIPTION OF THE DRAWINGS

FIG. 4 is a flowchart illustrating another aspect of the present invention;

DETAILED DESCRIPTION

Figure 1A:
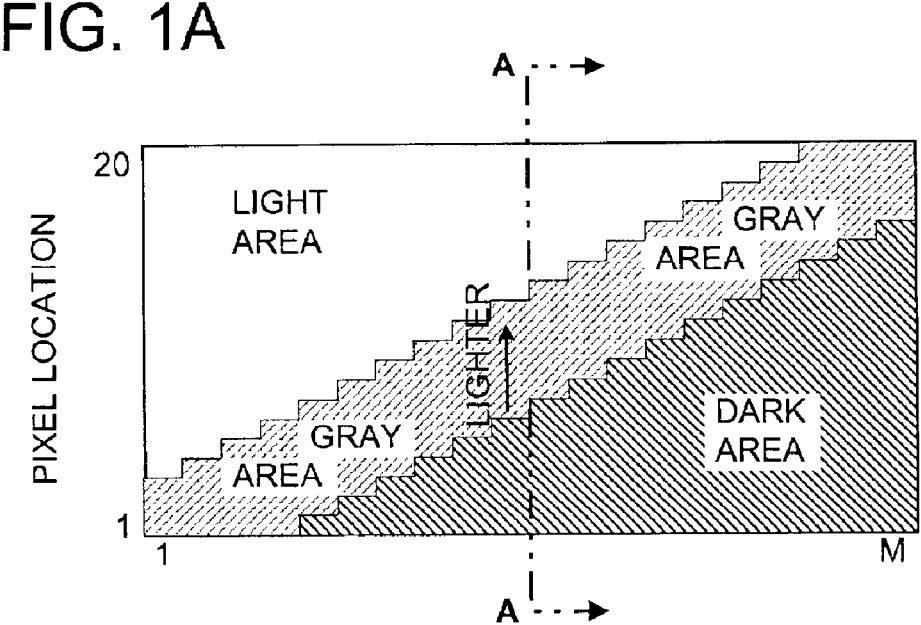
FIG. 1A illustrates a section of a sample image in digitized format.

As shown in the drawings for purposes of illustration, the present invention is embodied in a method of processing an image for detecting, or determining, an edge location by first identifying a zero crossing pixel location, $n_0$, within the image.

The zero crossing pixel location $n_0$ is where the change in the gray scale value of the pixel in relation to its neighboring pixels is most abrupt, thus that pixel location is the most likely location of an edge. This pixel can be found by locating the pixel where the value of the second derivative of the image signal, representing gray values of the pixels, is zero.

The location of the edge is further refined by determining an offset, a, from the pixel location $n_0$. In part, the offset, a, is found using the relationship between interpolated image and an interpolated kernel at the zero crossing pixel location as detailed herein below. According to the method of the present invention, the computational requirement for detecting the edge is primarily reduced by performing the computationally costly filtering step on the original image instead of the interpolated (and typically larger) image.

Sub-pixel Edge Detection

Sample Image, Nomenclature, and Summary

Figure 1B:
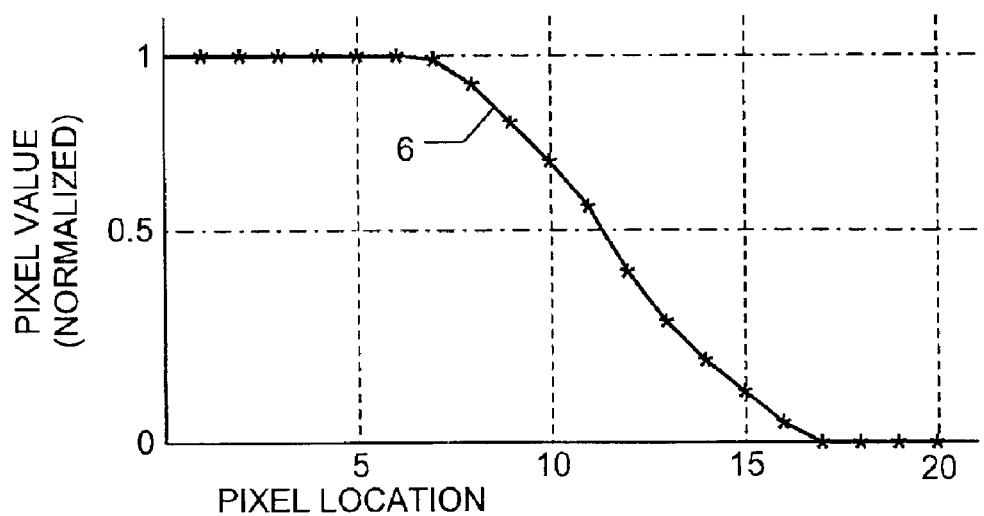
FIG. 1B illustrates a profile of values of a column (along line A—A of the image of FIG. 1A) of pixels and an interpolation curve of the column.

FIG. 1A illustrates a sample 2D image having an edge blurred by optics and under-sampling. In FIG. 1A, the edge is within the Gray Area within which the gray value stepwise progressively gets lighter as the pixel number (location) increases. FIG. 1B illustrates normalized values of pixels of the sample 2D image across line A—A of FIG. 1A, the pixel values shown as a one-dimensional (1D) data points of the single column of pixels at the line A—A. For brevity, the data points, collectively, are referred to as a discrete function x[n] where n is a discrete value (the pixel location) and x[n] is the gray value of the pixel at location n.

In the present example as illustrated in FIGS. 1A and 1B, n is an index to the pixel location and ranges between 1 and 20, inclusive. Here edge detection in a one dimension (1D) array, x[n], is discussed. However, it is clear that the present invention is applicable for images in multiple dimensions, where for example at least two such 1D location measurements are used to determine the sub-pixel location of an edge in a 2D image.

Given the image represented by the discrete 1D function x[n], an interpolated function x(t) represents a linear interpolation of the discrete function x[n] and is illustrated in FIG. 1B as curve 6. For function x(t), t is the sub-pixel location parameter and x(t) is the interpolated gray value at interpolated location t.

Function x(t) is equal to x[n] where t is equal to n. Where t is not equal to n, but is between two discrete points n−1 and n, then t is expressed as $$t = n - 1 + a \qquad (Eq.1)$$

where a is an offset value between 0 and 1.

Applying equations Eq.1 to the interpolated function x(t), x(t) can be expressed as ti $x(t) = (1-a) \times [n-1] + a \times [n]$ This is because Eq.1 can be rewritten as $$t = (1-a)(n-1) + an$$

Figure 2:
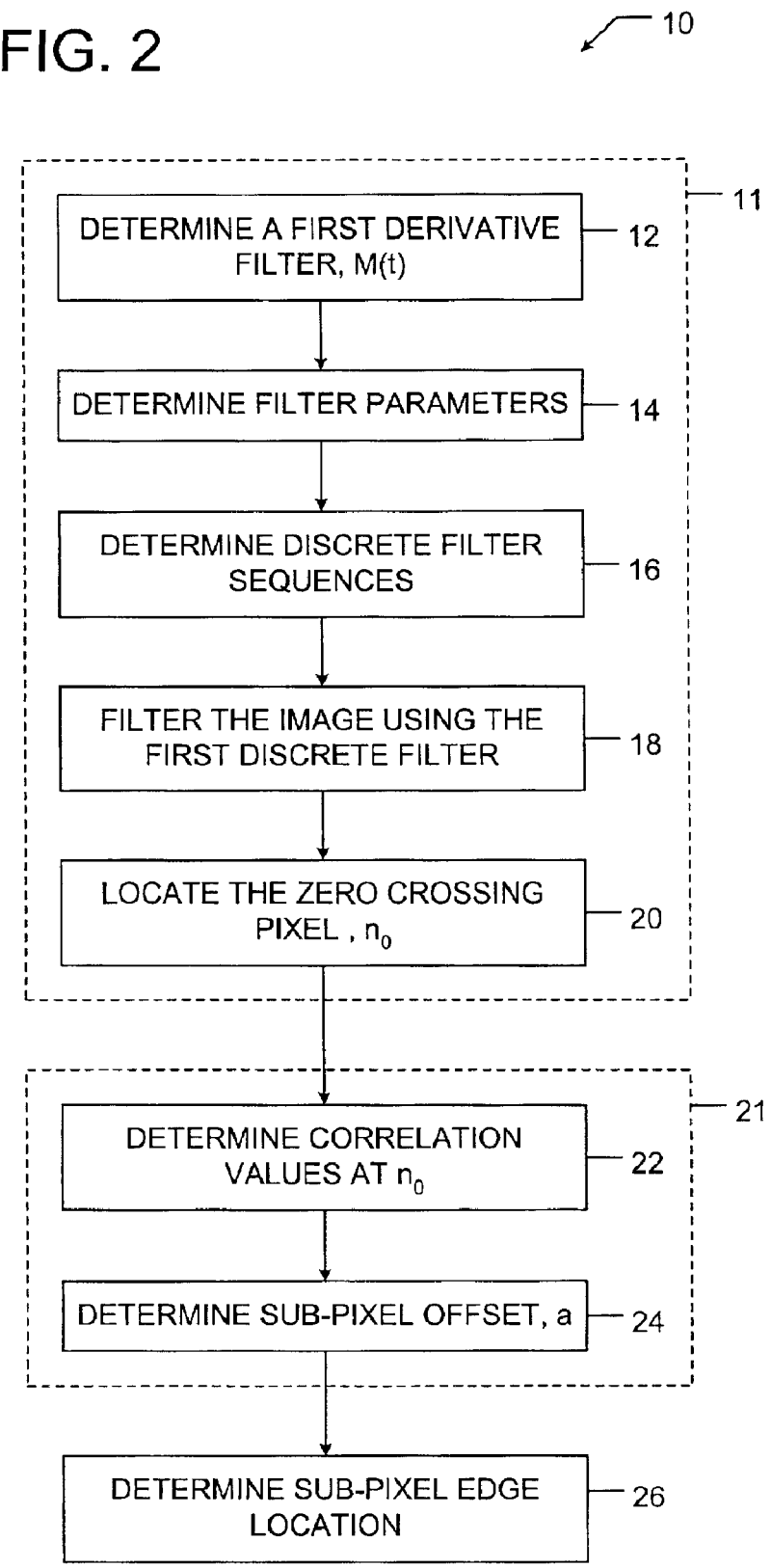
FIG. 2 is a flowchart illustrating one aspect of the present invention.

The method according to one embodiment of the present invention may be described using a flowchart 10 of FIG. 2. In summary, the present inventive technique includes three major steps. One, to identify a zero crossing pixel location, $n_0$, within the image as illustrated by dashed box 11. Two, to determine a sub-pixel position offset, a, at the zero crossing pixel location; the offset, a, being a relationship between interpolated image and an interpolated kernel at the zero crossing pixel location as illustrated by dashed box 21. And three, to determine an edge location, $t_0$, of the image using the pixel location, $n_0$, and the sub-pixel position offset, a as illustrated by box 26. The boxes, or steps, 11 and 21 include more detailed steps as discussed herein below.

Determine a First Derivative Filter for use in Edge Detection

Figure 3A:
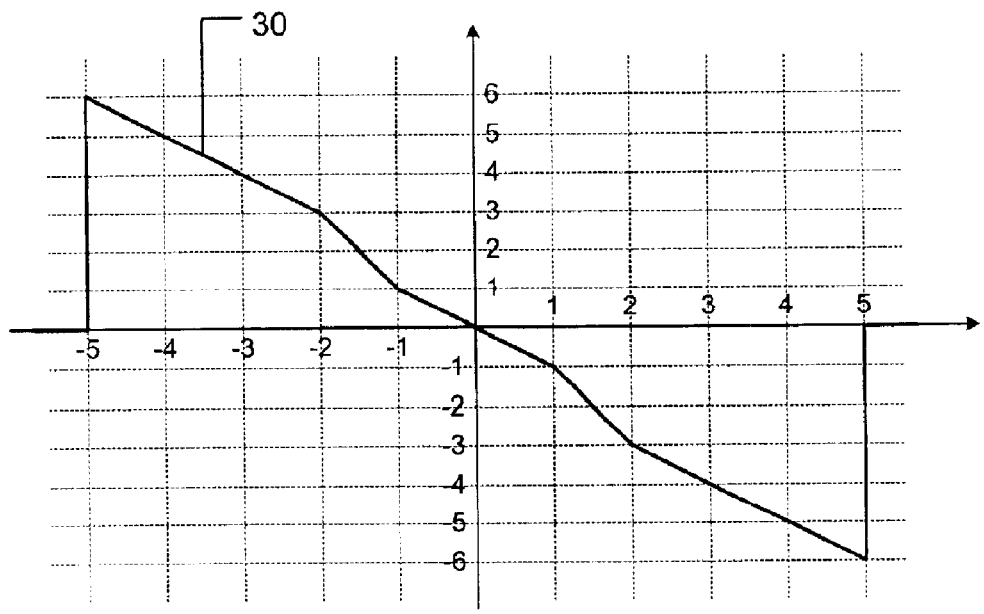
FIG. 3A illustrates a sample discontinuous piecewise-linear function, M(t), with break points at integral points only.

Further in FIG. 2, in the first step (denoted by procedural box 12), a desired first derivative filter (the "desired filter") is determined. The desired filter is an edge detection filter having potentially discontinuous piecewise-linear shape with break points at integral points only. FIG. 3A illustrates a curve 30 as an example of such first derivative edge detection filter, denoted as M(t). The sample function M(t) 30 illustrated in FIG. 3A is piecewise linear with break points at discrete integral points. Function M(t) 30 is a discrete approximation of a first derivative at a given scale.

Generally, a good approximation of the first derivative is obtained by convolution with a mask M(t) whose profile is similar to the first derivative of a Gaussian function where variance (sigma) of the Gaussian is the scale of the corresponding edge.

Both the derivative of the Gaussian and a matched filter motivated profiles have a notion of scale. Matched Filters are known in the art of communication and signal processing. A matched filter is a filter whose kernel profile is identical (up to mirroring and translation) to an expected signal. It is an optimal filter for locating a given signal in 'white Gaussian noise' (a good model for noise in most communication systems). The standard deviation parameter of the Gaussian and the blur of the expected edge are indicators of the scale of the expected edge. In general, edges at scales smaller than the expected scale might represent texture or noise, and cancel each other at the appropriate scale. On the other hand, edges at scales larger than the expected edge may be part of, for example, illumination variations on a flat surface.

Nevertheless, M(t) is not necessarily any of the above approximations. Function M(t) 30 is an example of a different approximation of a derivative. Note that, the horizontal range of −5 to 5 pixels in the sample function M(t) may be different for different applications (it will usually be proportional to the scale of the desired edge).

Determine Parameters of the Derivative Filter

Using M(t), parameter functions b[n] and d[n] are determined, (step 14 of FIG. 2). The parameters describe the derivative filter M(t) in spatial scale and can be used to form filters, or kernels, which are then used to further refine the edge location.

Parameter functions b[n] and d[n] can be used to describe M(t) because any potentially discontinuous piecewise-linear function having break points at integral points only, for example M(t), can be represented by the following general form:

$$M(t) = \sum_i d[i]r(t-i) + b[i]\mu(t-i) \quad \text{(Eq. 2)}$$

where t is a location parameter;
d[i] is a scalar ramp parameter for the interval [i, i+1] and can be referred to as a ramp parameter function;
b[i] is a scalar bias parameter for the interval [i, i+1] and can be referred to as a step parameter function;

r(t) is a ramp function $$r(t) = \begin{cases} 1-2t & t \in [0,1] \\ 0 & \text{Otherwise} \end{cases}$$

$\mu(t)$ is step function $$\mu(t) = \begin{cases} 1 & t \in [0,1] \\ 0 & \text{Otherwise} \end{cases}$$

the sum is taken over index i covering all parameter functions b[n] and d[n] (values not defined are considered 0).

Step parameter function b[n] is the bias sequence of M(t) where b[n] is an average value of M(t) in the interval [n, n+1], which is, due to the linearity $$b[n]=(M(n)+M(n+1))/2$$

Ramp parameter function d[n] is the ramp sequence of M(t) where d[n] is the slope of M(t) in the interval [n, n+1], which is, $$d[n]=(M(n)-M(n+1))/2$$

Figure 3B:
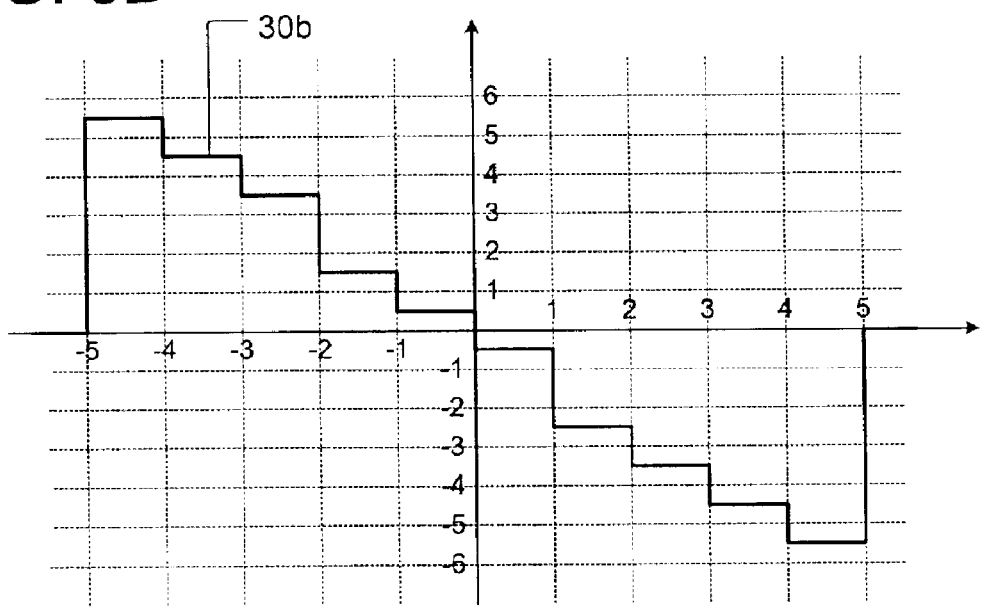
FIG. 3B illustrates step sequence of the function M(t) of FIG. 3A.
Figure 3C:
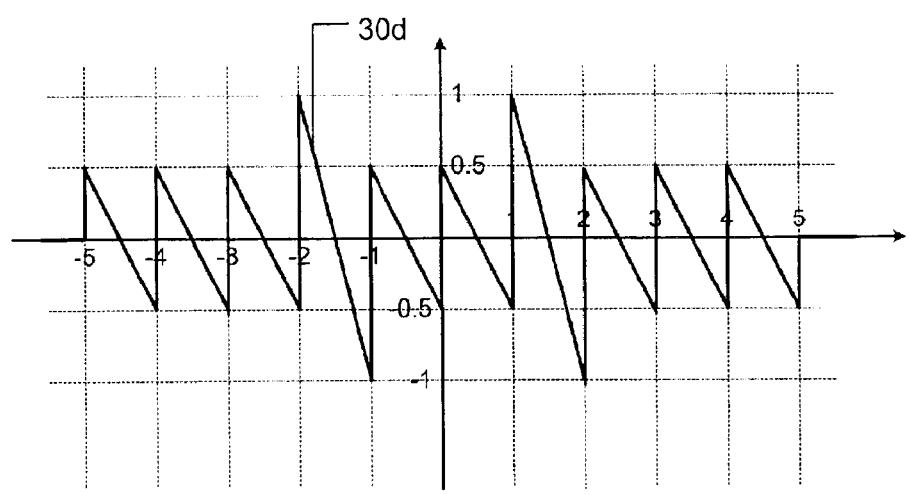
FIG. 3C illustrates ramp sequence of the function M(t) of FIG. 3A.

A sample step parameter function b[n] is illustrated in FIG. 3B as curve 30b. A sample ramp parameter function d[n] is illustrated in FIG. 3C as curve 30d.

Determine Discrete Filter Sequences

Next, three filter sequences are determined using the parameter sequences defined herein above, (step 16). These filter sequences are used in the spatial dimension to locate the pixel containing the edge, $n_0$, and to find coefficients of a polynomial that describe an interpolated function of the image near the pixel location no as further explained below.

A first discrete step filter, F1, is a convolution of the step parameter function b[n] and [1,-1], $$F1=[\ldots b_{-1}, b_0, b_1, b_2, \ldots]*[1,-1]$$

namely, $$F1[i]=b[i+1]-b[i]$$

A second discrete filter, F2, is a convolution of the step parameter function b[n] and [1, -2, 1], $$F2=[\ldots b_{-1}, b_0, b_1, b_2, \ldots]*[1,-2,1],$$

namely, $$F2[i]=b[i+1]-2b[i]+b[i-1]$$

A third discrete filter, F3, is a convolution of the ramp parameter function d[n] and [1, -2, 1], $$F3=[\ldots d_{-1}, d_0, d_1, d_2, \ldots]*[1,-2,1]$$

namely, $$F3[i]=d[i+1]-2d[i]+d[i-1]$$

Filter the Image Using the First Discrete Filter

Next, in Step 18, the 1D discrete sequence x[n] of pixel values (of the image in an area crossed by the edge to be located) is filtered with the filter F1. Here, the original image is correlated, or filtered, to the first filter F1 to determine the zero crossing pixel. Resultant of this correlation step is a first correlation sequence Y1[n], where $$Y1[n] = x[n] \otimes F1[n], \text{ namely,}$$

$$Y1[n] = \sum_k F1[k]x[n+k]$$

where k covers the range for which the F1 entries are defined, and n covers the range for which the x entries are defined.

Locate the Zero Crossing Pixel $n_0$ Using the First Correlation Sequence

In Step 20, pixel location $n_0$ is determined where the zero crossing occurs. This is the pixel location $n_0$ for which $Y1[n_0]*Y1[n_0-1]$ is less than or equal to zero (0). Assuming x[n] crosses a single edge at the scale for which M(t) was designed, $n_0$ is unique.

Determine Correlation Values at $n_0$

Next, in step 22, the image, x[n], is filtered, or correlated, with filters F1, F2, and F3 only at the zero crossing pixel location $n_0$ to find three correlation values as follows $$Y1[n_0]=x[n] \otimes F1[n], \text{ at } n=n_0; \text{ and}$$

$$Y2[n_0]=x[n] \otimes F2[n], \text{ at } n=n_0; \text{ and}$$

$$Y3[n_0]=x[n] \otimes F3[n], \text{ at } n=n_0.$$

Note that, since the correlation values need only be determined at the zero crossing pixel location, much of computation overhead is reduced. Each of the correlation values, $Y1[n_0]$, $Y2[n_0]$, and $Y3[n_0]$ at $n_0$ is a scalar number. The first correlation value, $Y1[n_0]$ is available from the previous step.

Determine the Offset

In the next step, step 24, the offset value, a, is determined by solving the following quadratic equation for the variable a:

$$0=Y1[n_0]-(Y2[n_0]*a)+(Y3[n_0]*a*(1-a))$$

Solutions to the quadratic equations are commonly known in the art. It is easily verified that this equation has a single solution for a between values 0 and 1 which is the desired solution for our application.

Determine the Sub-Pixel Edge Position

Finally, in step 26, the offset, a, is used to determine the sub-pixel edge location, $t_0$, at the pixel location $n_0$ using the equation below:

$$t_0=n_0-1+a$$

Extending The Technique To Multi-Dimensional Images

For two dimensional (2D) images, each edge point can be represented as $[t_{1-0}, t_{2-0}]$ where $t_{1-0}$ is the edge location parameter in a first axis (for example, the x-axis) and $t_{2-0}$ is the edge location parameter in a second axis (for example, the y-axis, orthogonal to the x-axis). The illustrated steps can repeated for multiple rows and columns crossing the same straight or otherwise parametrically defined edge to determine the location of edges in the image being analyzed.

For a 2D image having a generally positioned straight edge, several (at least two) edge points of the straight edge can be found using the steps illustrated above in order to determine the location of the straight edge. For a 2D image having a generally positioned circular edge, several (at least three) edge points of the circular edge can be found using the steps illustrated above in order to determine the location of the circular edge. The 2D image is referred to as x[k, j] in its discrete form and $x(t_1, t_2)$ in its interpolated form.

More edge location measurements can be used in a linear or parametric fitting algorithm to determine the parameters describing the edge. Then, the parameters can be used to determine the entire edge. Parametric fitting algorithms to determine parametric functions using points on the parametric curve are known in the art.

Comparing Detected Edges with Model Edges

The location of image edges can be further refined by comparing the detected edge locations (of the object of the image under the analysis, or the "detected object") with known edge locations of a model object in a preconfigured database. Flowchart 40 of FIG. 4 illustrates one method of correlating the detected object with the model object data. The goal of this technique is to use the model of the detected image, and locate patterns and matches as a peak of the cross correlation between the model and the image.

This method exploits spatial data as well as gray-value information. As for the sub-pixel accuracy, similar to the previous method, the edges (of both the detected object and the model object) are expanded by interpolation, and sub-pixel positioning is determined. Similar to the method used in the previous section, it is possible to skip direct interpolation, and apply interpolation on a cross-correlation function.

Here, the cross-correlation term is replaced by more convenient (in terms of computational complexity) Mean-Square Error (MSE) measure. Thus, the location searched is the one that gives minimal MSE between the detected object edge locations and the model object edge locations.

An efficient way to implement the minimization of the MSE criteria is through the differential approach. Assume that we know the MSE value at a specific point. Since the MSE function is expected to be spatially smooth, the MSE is found by descending towards lower MSE values. This can be implemented using a differential approach, also known as Optical Flow (OF) estimation. OF is a simple, fast algorithm that enables sub-pixel accuracy results.

For convenience, a 2D model object (including its pixel values, including edge location data) is referred to as function L[k, j] where k is the index in a first axis (for example, the x-axis), j is the index in a second axis (for example, the y-axis, orthogonal to the x-axis), and L[k, j] is the pixel value at location [k, j]. Further, $L(t_1, t_2)$ is the model data in interpolated form.

Then, the present invention finds a translation vector $[v_1, v_2]$, where $v_1$ is the difference in the first direction and $v_2$ is the difference in the second direction, orthogonal to the first direction where the translation vector $[v_1, v_2]$ provides a best match between signal $x(t_1, t_2)$ and $L(t_1+v_1, t_2+v_2)$.

Determine Inverse Model-Edge Correlation Matrix

First, an inverse model-edge correlation matrix, $V^{-1}$, is determined where matrix V is the edge correlation matrix of the model image, (step 42). Then, model-edge correlation matrix V is $$V = \begin{bmatrix} \sum_{k,j} L_{t_1}^2[k, j] & \sum_{k,j} L_{t_1}[k, j]L_{t_2}[k, j] \\ \sum_{k,j} L_{t_1}[k, j]L_{t_2}[k, j] & \sum_{k,j} L_{t_2}^2[k, j] \end{bmatrix}$$

where $L_{t_1}[k, j]$ and $L_{t_2}[k, j]$ are discrete derivatives of L[k, j] in the first and the second axis, respectively; for example, $L_{t_1}[k, j]=L[k, j]-L[k-1, j]$;

$L_{t_2}[k, j]=L[k, j]-L[k, j-1]$; and $L^2_{t_1}[k, j]$; and $L^2_{t_2}[k,j]$ are discrete derivatives of L[k,j] in the first and the second axis, respectively.

The inverse model-edge correlation matrix, $V^{-1}$, is the inverse of the matrix V.

Determine Initial Translation

Next, the difference ("translation") of the edge locations between the model object and the detected object is determined, (step 44). For example, edge locations detected using the algorithm described above are compared with corresponding edge locations of the model data to determine the translation, or the difference in sub-pixel units. The initial translation vector can be a rough estimate.

Determine Cross Correlation Vector

A cross correlation vector, $C(v_1, v_2)$ is then determined, (step 46). The cross correlation vector, $C(v_1, v_2)$ is the difference between translated version of $x(t_1, t_2)$ and L[k, j] and the derivatives of L[k, j], or namely, $$C(v_1, v_2) = \begin{bmatrix} \sum_{k,j} (x_{[v_1,v_2]}[k, j] - L[k, j])L_{t_1}[k, j] \\ \sum_{k,j} (x_{[v_1,v_2]}[k, j] - L[k, j])L_{t_2}[k, j] \end{bmatrix}$$

where $L_{t_1}[k, j]$ and $L_{t_2}[k, j]$ are discrete derivatives of L[k, j] in the first and the second axis, respectively; and $x_{[v_1,v_2]}[k,j]$ is the displacement of the discrete-space image x[k, j] by $[v_1, v_2]$ which can be evaluated by interpolation (nearest neighbor bilinear or bicubic).

Determine Translation Error

Next, as indicated by step 48, using the translation cross correlation, $C(v_1, v_2)$, and the inverse model-edge correlation matrix, $V^{-1}$, a translation error vector $[e_1, e_2]$ is determined as $[e_1, e_2]=V^{-1}*C(v_1, v_2)$ where $e_1$ and $e_2$ are error in translations in the first and the second axis, respectively. Here, in effect, interpolation is applied to the cross correlation vector rather than directly on the image.

Update the Translation Values

The errors are added to the translation vector $[v_1, v_2]$ to update the translation vector (as indicated by step 50), or expressed mathematically, $[v_1, v_2]_{new}=[v_1, v_2]+[e_1, e_2]$ Repeat If Necessary Using the new translation vector $[v_1, v_2]$, as indicated by steps 46 though 52, inclusive, may be repeated to decrease the translation error. This is indicated by a decision step 52 and loop 53. These steps (46 through 52) are repeated until a predetermined tolerance is met or a predetermined number of iterations have been performed. Then, the operation terminates, (step 54).

Apparatus Configured to Implement the Invention

Figure 5:
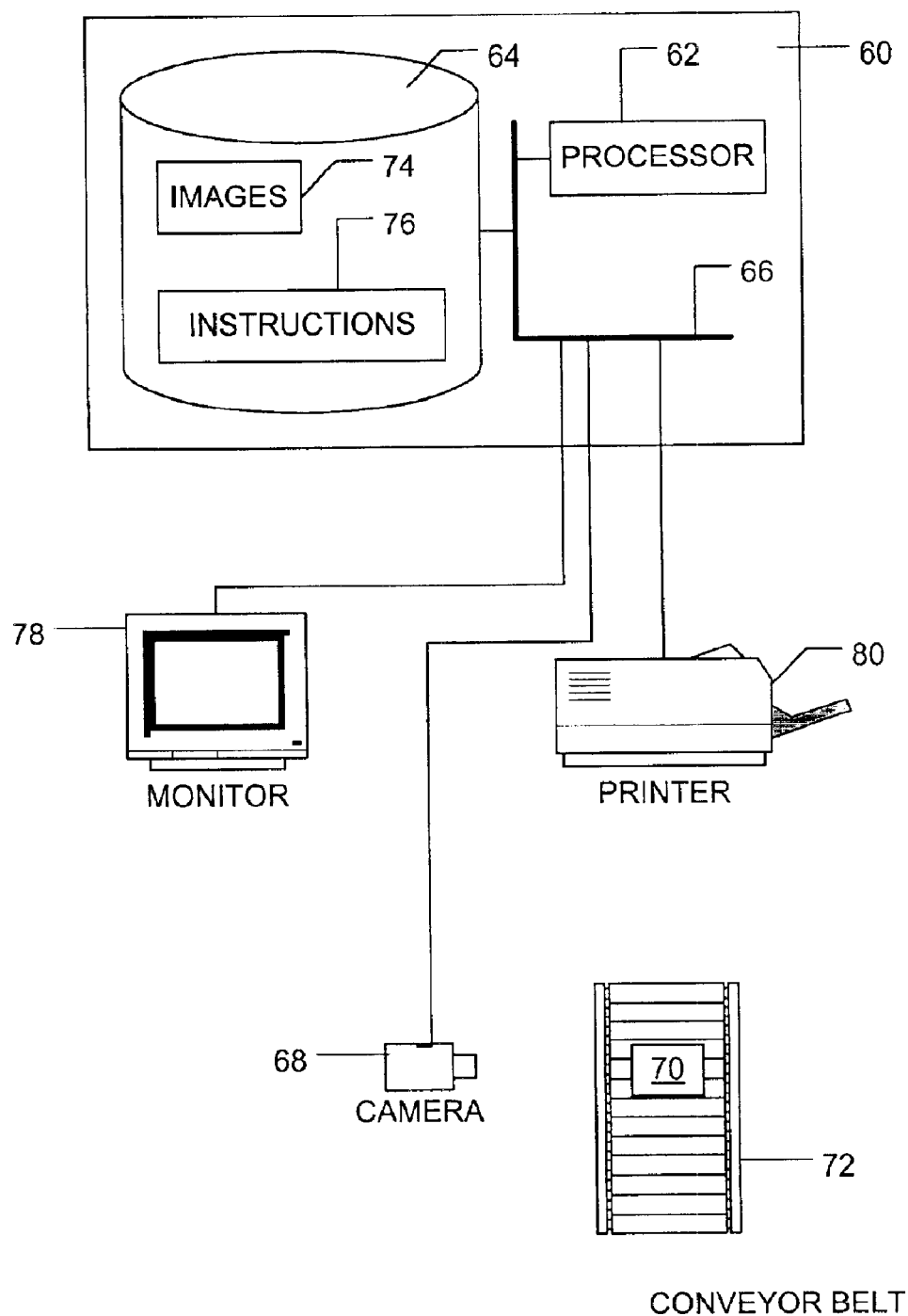
FIG. 5 illustrates an apparatus according to one embodiment of the present invention.

In FIG. 5, a computing apparatus 60 in accordance with one embodiment of the present invention is illustrated. The apparatus 60 including a processor 62 and storage 64, connected to the processor 62, is illustrated. The processor 62 is connected to the storage 64 via system bus 66.

Other devices are also connected to the system bus 66 such as a camera 68 to capture images of an object 70 on a conveyer belt 72, for example. The images are stored in the storage 64 as image files 74. The storage 64 also includes model image files. The storage 64 further includes instructions 76 for the processor 62 to perform the image processing operations and the steps discussed herein above including, but not limited to, filtering (convolution and correlation) and interpolation operations. The storage 14 may take any machine-readable form including solid-state random access memory (RAM), optical (such as CD ROM), magnetic (such as hard drives), or any combination of these. The apparatus 60 may be connected, via its bus 66, to other devices such as a printer.

From the foregoing, it will be appreciated that the present invention is novel and offers advantages over the current art. Although a specific embodiment of the invention is described and illustrated above, the invention is not to be limited to the specific forms or arrangements of parts so described and illustrated. The invention is limited by the claims that follow.

What is claimed is:

1. A method of processing an image, the method comprising:

determining a first discrete filter sequence, F1;

determining a second discrete filter sequence, F2;

determining a third discrete filter sequence, F3;

filtering the image using the first discrete filter sequence to generate a correlation sequence including a first correlation value, $Y1[n_0]$;

locating a zero crossing pixel location, $n_0$, within the image using the correlation sequence;

filtering the image at pixel location $n_0$ using the second discrete filter sequence to generate a second correlation value, $Y2[n_0]$;

filtering the image at pixel location $n_0$ using the third discrete filter sequence to generate a third correlation value, $Y3[n_0]$;

determining a sub-pixel position offset, a, at the zero crossing pixel location using the first correlation value, $Y1[n_0]$, the second correlation value $Y2[n_0]$, and the third correlation value, $Y3[n_0]$; and determining an edge location, $t_0$, of the image using the pixel location, $n_0$, and the sub-pixel position offset, a.

2. The method recited in claim 1 further comprising;

determining a first derivative filter, M(t), of desired scale, wherein M(t) is a discontinuous piecewise-linear function with break points at integral points;

determining a step parameter function, b[n], and a ramp parameter function, d[n], using the first derivative filter, M(t);

determining the first discrete filter sequence and the second discrete filter sequence using the step parameter function, b[n]; and determining the third discrete filter sequence using the ramp parameter function, d[n].

3. The method recited in claim 2 wherein the first discrete filter sequence comprises a convolution of the step parameter function, b[n], and [1, −1], wherein the second discrete filter sequence comprises a convolution of the step parameter function, b[n], and [1, −2, 1], and wherein the third discrete filter sequence comprises a convolution of the ramp parameter function, d[n], and [1, −2, 1].

4. The method recited in claim 1 further comprising:

determining the edge location, $t_0$, of the image by solving an equation:

$$t_0 = n_0 - 1 + a.$$

5. The method recited in claim 1 further comprising determining the sub-pixel position offset by solving a quadratic relationship:

$$0 = Y1[n_0] - (Y2[n_0]*a) + (Y3[n_0]*a*(1-a)).$$

6. The method recited in claim 1 wherein the step of locating the zero crossing pixel location comprises:

determining pixel location $n_0$, where a product of the first correlation value, $Y1[n_0]$, at $n_0$ and a fourth correlation value, $Y1[n_0-1]$, at $n_0-1$ of the correlation sequence is less than or equal zero (0).

7. The method recited in claim 1 wherein the steps of claim 1 are repeated for several columns of pixels of the image.

8. The method recited in claim 1 wherein the steps of claim 1 are repeated for several rows of pixels of the image.

9. A method of processing an image, the method comprising:

a. determining an inverse model-edge correlation matrix, $V^{-1}$, where the model-edge correlation matrix V is defined as:

$$V = \begin{bmatrix} \sum_{k,j} L_{t_1}^2[k,j] & \sum_{k,j} L_{t_1}[k,j]L_{t_2}[k,j] \\ \sum_{k,j} L_{t_1}[k,j]L_{t_2}[k,j] & \sum_{k,j} L_{t_2}^2[k,j] \end{bmatrix}$$

where $L_{t_1}[k,j]$ and $L_{t_2}[k,j]$ are discrete derivatives of $L[k,j]$ in the first and the second axis, respectively;

b. determining translation $[v_1, v_2]$ between detected edge locations of an object in the image and corresponding edge locations of a model object;

c. determining cross correlation between the detected object edge location and the corresponding model edge location;

d. determining a translation error vector $[e_1, e_2]$; and e. updating the translation.

10. The method recited in claim 9, wherein the cross correlation vector $C(v_1, v_2)$ of the difference between the translated version of the detected object image, $x(t_1, t_2)$, and the corresponding model image, $L[k,j]$, on one side, and the derivatives of the model on the other side, is defined by relationship:

$$C(v_1, v_2) = \begin{bmatrix} \sum_{k,j} (x_{[v_1,v_2]}[k,j] - L[k,j])L_{t_1}[k,j] \\ \sum_{k,j} (x_{[v_1,v_2]}[k,j] - L[k,j])L_{t_2}[k,j] \end{bmatrix}$$

where $L_{t_1}[k,j]$ and $L_{t_2}[k,j]$ are discrete derivatives of $L[k,j]$ in the first and the second axis, respectively, $x_{[v_1,v_2]}[k,j]$ is displacement of the discrete-space image $x[k,j]$ by $[v_1, v_2]$ which can be evaluated by interpolation.

11. The method recited in claim 10 wherein the translation error vector is a product of the inverse model-edge correlation matrix and the cross correlation vector.

12. The method recited in claim 11 wherein the translation is updated by adding the translation error $[e_1, e_2]$ to the translation $[v_1, v_2]$.

13. The method recited in claim 9 further comprising the step of repeating steps c through e of claim 9.

14. An apparatus for processing an image, the apparatus comprising:
- a processor;
- storage connected to the processor, the storage including instructions for the processor to:
  - determine a first derivative filter, M(t), of desired scale, wherein M(t) is a discontinuous piecewise-linear function with break points at integral points;
  - determine a step parameter function, b[n], and a ramp parameter function, d[n], using the first derivative filter, M(t);
  - determine a first discrete filter sequence, F1, using the step parameter function, b[n];
  - determine a second discrete filter sequence, F2, using the step parameter function, b[n];
  - determine a third discrete filter sequence, F3, using the ramp parameter function, d[n];
  - filter the image using the first discrete filter sequence to generate a correlation sequence including a first correlation value, $Y1[n_0]$;
  - locate a zero crossing pixel location, $n_0$, using the correlation sequence;
  - filter the image at pixel location $n_0$, using the second discrete filter sequence to generate a second correlation value, $Y2[n_0]$;
  - filter the image at pixel location $n_0$, using the third discrete filter sequence to generate a third correlation value, $Y3[n_0]$;
  - determine a sub-pixel position offset, a, at the zero crossing pixel location using the first correlation value, $Y1[n_0]$, the second correlation value $Y2[n_0]$, and the third correlation value, $Y3[n_0]$; and
  - determine an edge location, $t_0$, of the image using the pixel location, $n_0$, and the sub-pixel position offset, a.

15. The apparatus recited in claim 14 wherein the apparatus is connected to an image capture device for capturing the image for analysis.

16. The apparatus recited in claim 14 wherein the storage further comprises instructions for the processor to:
  - determine the sub-pixel position offset by solving a quadratic relationship:

$$0 = Y1[n_0] - (Y2[n_0]*a) + (Y3[n_0]*a*(1-a)).$$

17. The apparatus recited in claim 14 wherein the storage further comprises instructions for the processor to:
  - locate the zero crossing pixel location by determining the pixel location, $n_0$, such that a product of the first correlation value, $Y1[n_0]$, at $n_0$ and a fourth correlation value, $Y1[n_0-1]$, at $n_0-1$ of the correlation sequence is less than or equal zero (0).

18. The apparatus recited in claim 14 wherein the first discrete filter sequence comprises a convolution of the step parameter function, b[n], and [1, −1], wherein the second discrete filter sequence comprises a convolution of the step parameter function, b[n], and [1, −2, 1], and wherein the third discrete filter sequence comprises a convolution of the ramp parameter function, d[n], and [1, −2, 1].

19. The apparatus recited in claim 14 wherein the storage further comprises instructions for the processor to:
  - determine the edge location, $t_0$, of the image by solving an equation:

$$t_0 = n_0 - 1 + a.$$

20. An apparatus for processing an image, the apparatus comprising:
- a processor;
- storage connected to the processor, the storage including instructions for the processor to:
  - determine an inverse model-edge correlation matrix, $V^{-1}$, where the model-edge correlation matrix V is defined as:

$$V = \begin{bmatrix} \sum_{k,j} L_{t_1}^2[k,j] & \sum_{k,j} L_{t_1}[k,j]L_{t_2}[k,j] \\ \sum_{k,j} L_{t_1}[k,j]L_{t_2}[k,j] & \sum_{k,j} L_{t_2}^2[k,j] \end{bmatrix}$$

where
$L_{t_1}[k,j]$ and $L_{t_2}[k,j]$ are discrete derivatives of $L[k,j]$ in the first and the second axis, respectively;
  - determine translation $[v_1, v_2]$ between detected edge locations of an object in the image and corresponding edge locations of a model object;
  - determine cross correlation between the detected object edge location and the corresponding model edge location; determine a translation error vector $[e_1, e_2]$; and
  - update the translation.

21. The apparatus recited in claim 20 wherein the cross correlation vector $C(v_1, v_2)$ of the difference between the translated version of the detected object image, $x(t_1, t_2)$, and the corresponding model image, $L[k,j]$, on one side, and the derivatives of the model on the other side, is defined by relationship:

$$C(v_1, v_2) = \begin{bmatrix} \sum_{k,j} (x_{[v_1,v_2]}[k,j] - L[k,j])L_{t_1}[k,j] \\ \sum_{k,j} (x_{[v_1,v_2]}[k,j] - L[k,j])L_{t_2}[k,j] \end{bmatrix}$$

where
$L_{t_1}[k,j]$ and $L_{t_2}[k,j]$ are discrete derivatives of $L[k,j]$ in the first and the second axis, respectively,
$x_{[v_1,v_2]}[k,j]$ is displacement of the discrete-space image $x[k,j]$ by $[v_1, v_2]$ which can be evaluated by interpolation.

22. The apparatus recited in claim 21 wherein the translation error vector is a product of the inverse model-edge correlation matrix and the cross correlation vector.

23. The apparatus recited in claim 22 wherein the translation is updated by adding the translation error $[e_1, e_2]$ to the translation $[v_1, v_2]$.

24. An article of manufacture for a computer, the article comprising:
- computer memory; and
- a program stored in the computer memory, the program, when executed, causing the computer to:
  - determine a first derivative filter, M(t), of desired scale, wherein M(t) is a discontinuous piecewise-linear function with break points at integral points;
  - determine a step parameter function, b[n], and a ramp parameter function, d[n], using the first derivative filter, M(t);
  - determine a first discrete filter sequence, F1, using the step parameter function, b[n];
  - determine a second discrete filter sequence, F2, using the step parameter function, b[n];
  - determine a third discrete filter sequence, F3, using the ramp parameter function, d[n];
  - filter the image using the first discrete filter sequence to generate a correlation sequence including a first correlation value, $Y1[n_0]$;

locate a zero crossing pixel location, $n_0$, using the correlation sequence;

filter the image at pixel location $n_0$, using the second discrete filter sequence to generate a second correlation value, $Y2[n_0]$;

filter the image at pixel location $n_0$, using the third discrete filter sequence to generate a third correlation value, $Y3[n_0]$;

determine a sub-pixel position offset, $a$, at the zero crossing pixel location by solving a quadratic relationship:

$$0 = Y1[n_0] - (Y2[n_0]*a) + (Y3[n_0]*a*(1-a));$$

and determine an edge location $t_0$, of the image by solving an equation:

$$t_0 = n_0 - i + a.$$

25. The article recited in claimed 24 wherein the article is selected from a group consisting of solid-state random access memory (RAM), optical device, magnetic device, or any combination of these.

26. The article of manufacture recited in claim 24 wherein the program, when executed, causes the computer to:

locate the zero crossing pixel location by determining the pixel location, $n_0$, such that a product of the first correlation value, $Y1[n_0]$, at $n_0$ and a fourth correlation value, $Y1[n_0-1]$, at $n_0-1$ of the correlation sequence is less than or equal zero (0).

27. The article of manufacture recited in claim 24 wherein the first discrete filter sequence comprises a convolution of the step parameter function, $b[n]$, and $[1, -1]$, wherein the second discrete filter sequence comprises a convolution of the step parameter function, $b[n]$, and $[1, -2, 1]$, and wherein the third discrete filter sequence comprises a convolution of the ramp parameter function, $d[n]$, and $[1, -2, 1]$.

28. An article of manufacture for a computer, the article comprising:

computer memory; and a program stored in the computer memory, the program, when executed, causing the computer to:

determine an inverse model-edge correlation matrix, $V^{-1}$, where the model-edge correlation matrix V is defined as:

$$V = \begin{bmatrix} \sum_{k,j} L_{t_1}^2[k,j] & \sum_{k,j} L_{t_1}[k,j]L_{t_2}[k,j] \\ \sum_{k,j} L_{t_1}[k,j]L_{t_2}[k,j] & \sum_{k,j} L_{t_2}^2[k,j] \end{bmatrix}$$

where $L_{t_1}[k,j]$ and $L_{t_2}[k,j]$ are discrete derivatives of $L[k,j]$ in the first and the second axis, respectively;

determine translation $[v_1, v_2]$ between detected edge locations of an object in the image and corresponding edge locations of a model object;

determine cross correlation between the detected object edge location and the corresponding model edge location;

determine a translation error vector $[e_1, e_2]$; and update the translation.

29. The article of manufacture recited in claim 28 wherein the cross correlation vector $C(v_1, v_2)$ of the difference between the translated version of the detected object image, $x(t_1, t_2)$, and the corresponding model image, $L[k,j]$, on one side, and the derivatives of the model on the other side, is defined by relationship:

$$C(v_1, v_2) = \begin{bmatrix} \sum_{k,j} (x_{[v_1,v_2]}[k,j] - L[k,j])L_{t_1}[k,j] \\ \sum_{k,j} (x_{[v_1,v_2]}[k,j] - L[k,j])L_{t_2}[k,j] \end{bmatrix}$$

where $L_{t_1}[k,j]$ and $L_{t_2}[k,j]$ are discrete derivatives of $L[k,j]$ in the first and the second axis, respectively, $x_{[v_1,v_2]}[k,j]$ is displacement of the discrete-space image $x[k,j]$ by $[v_1, v_2]$ which can be evaluated by interpolation.

30. The article of manufacture recited in claim 29 wherein the translation error vector is a product of the inverse model-edge correlation matrix and the cross correlation vector.

31. The article of manufacture recited in claim 30 wherein the translation is updated by adding the translation error $[e_1, e_2]$ to the translation $[v_1, v_2]$.

* * * * *